United States Patent
Pappalardo et al.

(10) Patent No.: US 6,943,615 B2
(45) Date of Patent: Sep. 13, 2005

(54) INTEGRATED CHARGE PUMP VOLTAGE BOOSTER

(75) Inventors: Domenico Pappalardo, Gravina di Catania (IT); Maurizio Gaibotti, Cesano Maderno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 263 days.

(21) Appl. No.: 10/371,151

(22) Filed: Feb. 21, 2003

(65) Prior Publication Data

US 2003/0174010 A1 Sep. 18, 2003

(30) Foreign Application Priority Data

Feb. 21, 2002 (IT) ..................................... VA2002A0017

(51) Int. Cl.[7] ............................................... G05F 3/02
(52) U.S. Cl. ........................ 327/536; 327/537; 363/60
(58) Field of Search ............................... 327/534, 535, 327/536, 537; 363/59, 60

(56) References Cited

U.S. PATENT DOCUMENTS

| 5,801,577 | A | * | 9/1998 | Tailliet | ....................... | 327/536 |
|---|---|---|---|---|---|---|
| 6,255,896 | B1 | * | 7/2001 | Li et al. | ...................... | 327/536 |
| 6,268,761 | B1 | * | 7/2001 | Naganawa | .................. | 327/536 |
| 6,356,137 | B1 | * | 3/2002 | Roohparvar et al. | ........ | 327/536 |
| 6,356,469 | B1 | * | 3/2002 | Roohparvar et al. | ........ | 327/536 |
| 6,366,158 | B1 | * | 4/2002 | Zeng et al. | ................. | 327/536 |

* cited by examiner

Primary Examiner—Terry D. Cunningham
(74) Attorney, Agent, or Firm—Lisa K. Jorgenson; Allen, Dyer, Doppelt, Milbrath & Gilchrist, P.A.

(57) ABSTRACT

The charge pump uses PMOS transistors for implementing the first and the second charge transfer switches of the charge pump. Substantially, the closing and opening of the first switch through which the first capacitor is charged, of the second switch for transferring the electric charge from the first capacitor to the load capacitance connected to the output node of the circuit and of the third switch for discharging to ground the load capacitance, are driven by a logic NOR gate. A first input of the NOR gate is connected to a common control node of the PMOS transistor forming the second switch and of a NMOS transistor forming the third switch, a second inverting input is connected to the output node, and the output is connected to the first capacitor.

18 Claims, 9 Drawing Sheets

INTEGRATED CHARGE PUMP VOLTAGE BOOSTER

FIELD OF THE INVENTION

The present invention relates to integrated circuits and more particularly to charge pump voltage boosters for low voltage devices.

BACKGROUND OF THE INVENTION

Voltage boosters are often integrated in memory devices and other integrated devices to provide higher voltages than the supply voltage. These higher voltages may be necessary in nonvolatile memory devices for erasing and writing data or for enhancing the driving conditions (overdriving) of output power devices or for other purposes. A commonly used architecture is shown in FIG. 1, the control phases of which are shown in the diagrams of FIG. 2.

Referring to the figures, the operation of the circuit is as follows. During a first phase of a digital signal (timing signal), the switches formed by the transistors M1 and M3 are closed, while the switch represented by the transistor M2 is open. In this way the capacitor C, biased through the control phase FX at the common reference potential (ground) of the circuit charges to the supply voltage $V_{dd}$ through the transistor M1, while the load capacity $C_L$ discharges to ground through the transistor M3 driven to a state of conduction by the control phase FN. The control phase FBN is at the supply voltage by keeping the transistor M1 turned on while the control phase FBX is at the common reference potential (null voltage or ground) by keeping the transistor M2 turned off.

During the successive phase, the transistors M1 and M3 are turned off by the switching of the respective control phases and the capacitor C, biased at the supply voltage by the switching of the control phase FX, charges the load capacity $C_L$ through the switch M2 that in this phase is turned on because of the switching of the control phase FBX. As it may be easily recognized, an output voltage is produced on the connection node of the load capacitance $C_L$ that substantially tracks the signal FX, that is a null voltage during a first part or phase of a cycle of the timing signal and a voltage equal to $V_{HT}$ that satisfies the inequality $V_{dd} < V_{HT} < 2V_{dd}$, during the second part or phase of the cycle.

Figure 1:
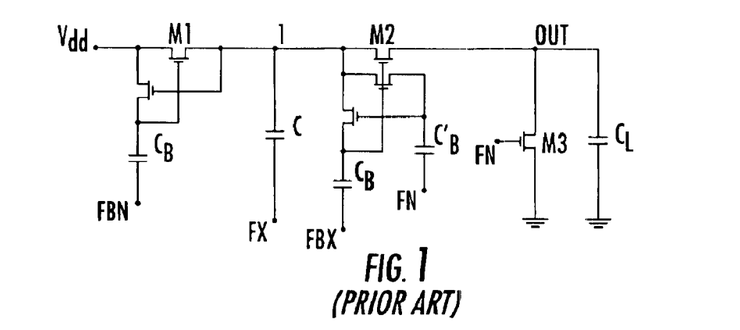
FIG. 1 is, as discussed above, a diagram of a prior art charge pump voltage booster.
Figure 2:
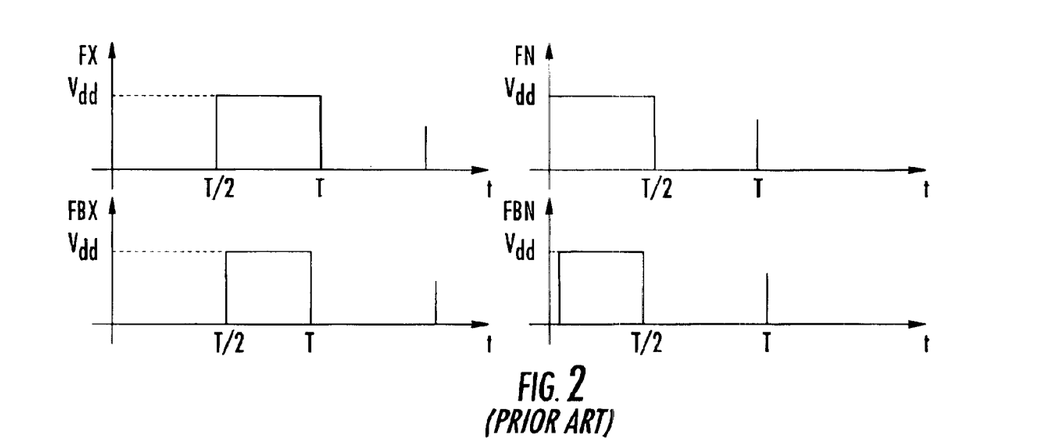
FIG. 2 shows the different control phases of the circuit of FIG. 1.

Such a circuit as shown in FIG. 1 driven by the phases FBX and FBN of amplitudes equal to the supply voltage $V_{dd}$ has a number of drawbacks: for relatively low supply voltages, as it is often the case in battery powered devices, the dimensions of the transistors become a crucial parameter and must be relatively large; during the transfer of electric charge from C to $C_L$, a voltage equivalent to a turn on threshold voltage of the transistor switch is lost and the output voltage $V_{OUT}$ is limited to the value $2V_{dd}-V_{th}$; and being the circuit used to boost the level of a certain digital signal, it is necessary to realize an appropriate circuit for generating the control phases as a function of the input digital signal to be boosted.

SUMMARY OF THE INVENTION

An object of the invention is to provide an integrated charge pump that substantially overcomes the above mentioned drawbacks of the prior art circuits.

Basically, the charge pump uses PMOS transistors instead of the commonly used NMOS transistors for implementing the first and the second charge transfer switches of the charge pump and does not require the generation of dedicated control phases by exploiting for the purpose the same input digital signal to be replicated with boosted voltage level, on the output node that is on the node of connection of the load capacitance. Substantially, the closing and opening of the first switch through which the first capacitor is charged, of the second switch for transferring the electric charge from the first capacitor to the load capacitance connected to the output node of the circuit and of the third switch for discharging to ground the load capacitance, are driven by a logic NOR gate. A first input of the NOR gate is connected to a common control node of the PMOS transistor forming the second switch and of a NMOS transistor forming the third switch, a second inverting input is connected to the output node, and the output is connected to the first capacitor.

In practice, the input timing signal is applied to the common control node of the second and third switches. To drive the charge pump of this invention the input digital signal is sufficient such that generating of dedicated control phases is no longer necessary. The load capacitance is pre-charged by the supply voltage and this allows to reduce the size of the first capacitor and the current consumption. Moreover, in view of the fact that the PMOS transistor forming the first switch is a low voltage transistor, it may have a relatively small area.

According to an alternative embodiment of the invention, it is possible to carry out an almost complete pre-charge of the load capacitance and realize a recovery of the current delivered by the first capacitor to the load capacitance and further reducing the size of the first capacitor that, in case of a purely capacitive load, may be almost halved. These and other advantages will be highlighted while describing the performances obtained by simulation. The invention is more precisely defined in the annexed claims.

DETAILED DESCRIPTION OF THE PREFERRED EMBODIMENTS

Figure 3:
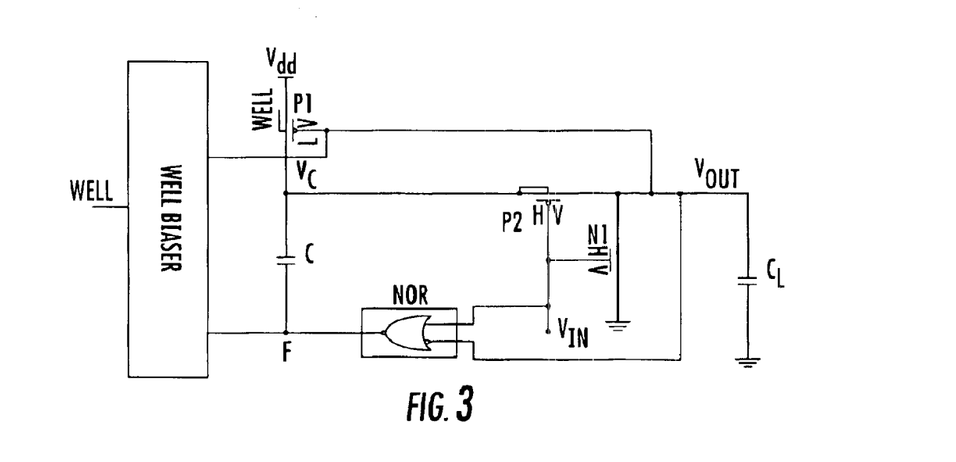
FIG. 3 is a basic diagram of an integrated charge pump according to the invention.

Referring to FIG. 3, the circuit of the invention operates as described hereinafter. When the voltage of the input digital signal $V_{IN}$ is high, the NMOS transistor that forms the third switch N1 for discharging the output node $V_{OUT}$, to which is connected the load capacitance $C_L$, turns on, and the output of the NOR circuit, that is the node F, is low. The output node $V_{OUT}$ discharges through the third switch N1 and the voltage Vc on the first capacitor C assumes a low state becoming smaller than the supply voltage $V_{dd}$ of the circuit, because during the previous phase of the cycle, the first capacitor C has delivered electric charge to the load capacitance $C_L$.

Therefore, the PMOS transistor forming the second switch P2 for transferring electric charge turns off while the second PMOS transistor forming the first charge switch P1 turns on thus charging the first capacitor C to the supply voltage $V_{dd}$. When the input signal $V_{IN}$ switches low (the successive phase of the cycle), the transistor N1 turns off and the PMOS transistor, which forms the second switch P2 for transferring electric charge, turns on. The voltage $V_{OUT}$ on the output node to which is coupled the load capacitance $C_L$ increases, initially pre-charging itself through the transistors P1 and P2 as far as the value of the voltage on the output node $V_{OUT}$ reaches a value sufficient to switch the output of the logic NOR circuit, that is the voltage on the node F switches from low to high. As a consequence of the rising of the voltage $V_C$ on the first capacitor C, the transistor P1 eventually turns off and a phase of repartition of the electric charge between the first capacitor C and the load capacitance $C_L$ takes place. To prevent latch-up problems, it is necessary to bias the body region (bulk) of the PMOS transistors so that at each instant of the cycle they remain at a higher voltage than the respective source and drain regions.

For a PMOS transistor P2, it is sufficient to connect the body region of the transistor to the source region. In this way, the single critical instant would be when the input signal $V_{IN}$ switches to the high state and as a consequence the voltages $V_C$ and $V_{OUT}$ switch to a low state. Should the voltage $V_C$ drop faster than the voltage $V_{OUT}$, the body would go at a lower voltage than the source and the diode present between the source and the body regions of the transistors would be directly biased. This occurrence may be prevented by properly dimensioning the transistor N1 and the NOR circuit.

Figure 4:
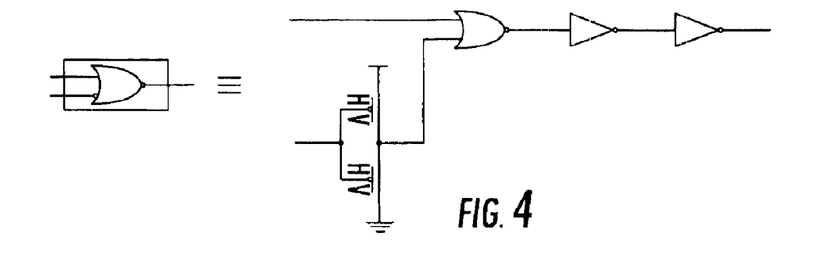
FIG. 4 shows an embodiment of the logic NOR circuit used in the circuit of this invention.

As far as the transistor P1 is concerned, it is necessary to realize a biasing line represented in the embodiment of FIG. 3 by the circuit block WELL BIASER. The logic NOR circuit present in the basic circuit of this invention of FIG. 3, may be realized in any suitable form. A possible embodiment is depicted in FIG. 4 using symbols appreciated by any skilled person in the art.

Figure 5:
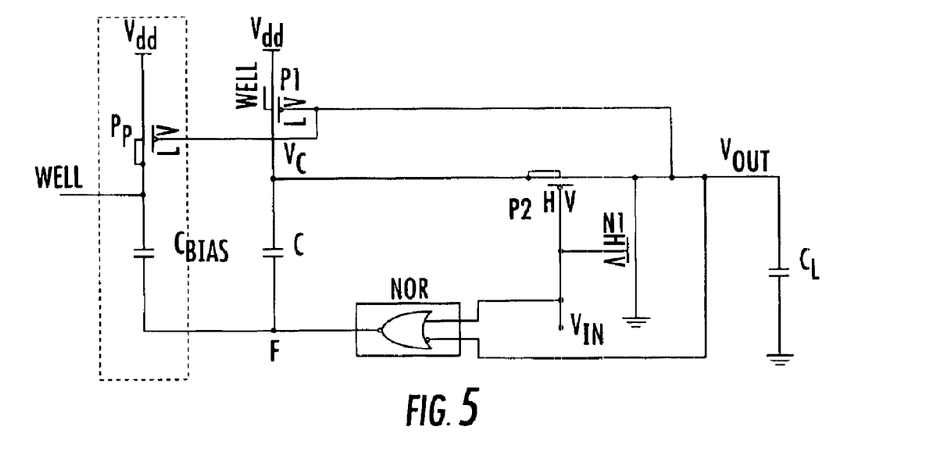
FIG. 5 shows an example of a biasing line of the body region of the PMOS transistor forming the first switch, for preventing latch-up.

The biasing line of the body region of the transistor P1 may be realized as depicted in FIG. 5. As it may be easily noticed, the line replicates the left side branch of the basic functional circuit, using components, that is a PMOS transistor and a capacitor $C_{BIAS}$, of reduced dimensions in respect to the transistor P1 and the capacitor C of the functional circuit. Given that the capacitor $C_{BIAS}$ must not deliver any current to the load, the voltage of the body region, that is the voltage on the node well of the circuit, is always greater than the source and drain voltages of the transistor P1 and is exploited to bias the bulk (the body region) of the transistor P1.

The circuit of this invention has the following advantages: the transistor P1 may be designed for a relatively low voltage and occupies a relatively small area; the load capacitance $C_L$ pre-charges toward the supply voltage $V_{dd}$ and this leads to a reduction of the size of the capacitor C and of current consumption; the circuit is driven only by the input signal $V_{IN}$ and does not require a generator of dedicated control phases, as in charge pumps of the prior art. Indeed, while pre-charging the load capacitance $C_L$, the transistor P1 is in practice diode configured and the load capacitance $C_L$ may at most be pre-charged at a voltage equivalent to the supply voltage minus the turn on voltage of the transistor P1 ($V_{dd}-V_{th}$).

Figure 6:
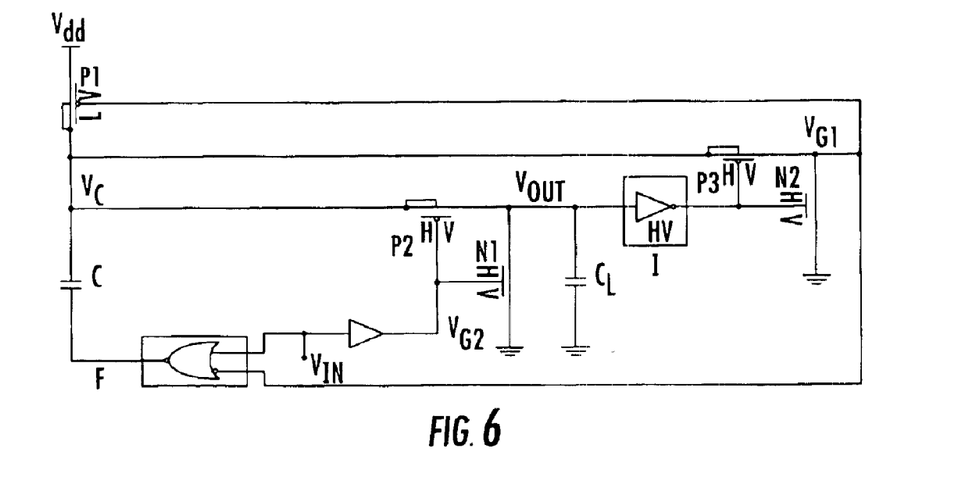
FIG. 6 is a basic diagram of an alternative embodiment of the charge pump according to the invention.

According to an alternative and slightly more complex embodiment of the circuit of this invention, even this issue can be substantially overcome. FIG. 6 depicts an alternative embodiment of the invention. By using a third PMOS transistor P3 and a second NMOS transistor N2, controlled through an inverter 1, it is possible to achieve an almost complete pre-charging of the load capacitance $C_L$ and to recover the current that the capacitor C has previously delivered to the load capacitance $C_L$.

Figure 7:
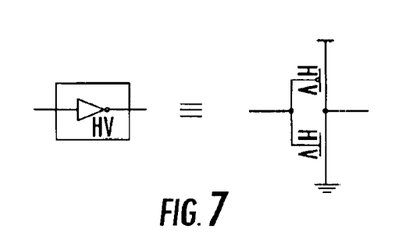
FIG. 7 is a circuit diagram of the inverter used in the circuit of FIG. 6.

FIG. 7, shows an appropriate embodiment of the driving inverter I, designed for functioning at high voltage (H.V.) and coupled to the output node ($V_{OUT}$) for driving the gate of the transistor P1 and the inverting input of the logic NOR circuit. In the scheme of FIG. 6 there is also shown an optional delay stage, that may be required for introducing a certain delay by the introduction of at least a unit gain buffer amplifier of the input signal $V_{IN}$. As shown, the transistor P2 and the transistor N1 are driven in common through a buffer amplifier indicated by the standard electrical symbol.

The operation is as follows.

When the voltage $V_{IN}$ switches high, the phase F immediately switches low and because the gate of P2 is still low, electric charge is transferred from $C_L$ to C and is in part recovered. With a short delay, which may be fixed by introducing a dedicated non inverting driven stage, represented in Figure by the relative symbol, the voltage $V_{G2}$ becomes equal to $V_{dd}$, turning off the transistor P2 and turning on the transistor N1 through which the capacitor $C_L$ finishes discharging. As the voltage $V_{OUT}$ switches low, the transistor P3 turns off, and the transistor N2 turns on thus turning on also the transistor P1 and allowing the charging of the capacitor C toward $V_{dd}$.

When the voltage $V_{IN}$ switches low, the voltage $V_{G2}$ becomes immediately zero thus turning off the transistor N1 and turning on the transistor P2. Because at that instant P1 and P2 are turned on, the capacitor $C_L$ may charge toward $V_{dd}$. With a short delay from the moment in which $V_{OUT}$ switches high, the transistor N2 turns off and the transistor P3 turns on. In this way $V_{G1}$ becomes high and the transistor P1 is configured as a diode. As the voltage $V_{G1}$ becomes high also the phase F becomes high, thus allowing a charge repartition between C and $C_L$ and making the voltage $V_{OUT}$ reach its final value.

As it may be noticed, according to this alternative embodiment, the biasing of the body region of the transistor P1, to prevent latch-up problems, may be carried out by simply connecting the body region (bulk) to the source region of the transistor. According to this alternative embodiment, it is possible to reduce further the size of the capacitor C and the current consumption. In particular the current consumption, if the load is purely capacitive, may be reduced of almost 50%.

Figure 8:
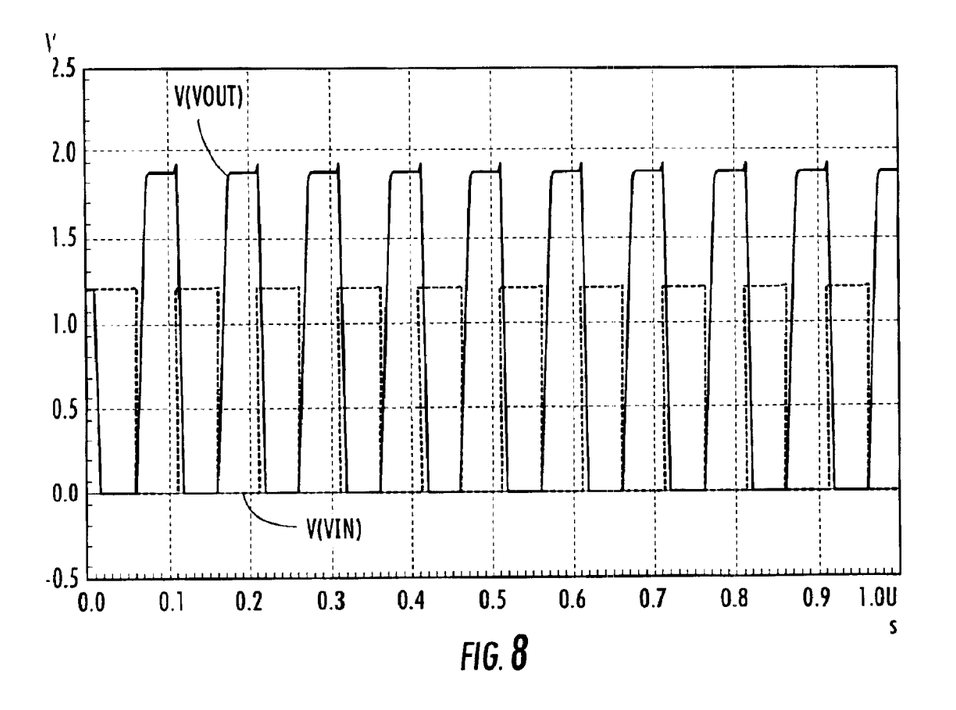
FIGS. 8 and 9 are waveforms of the input signal and of the output signal of the circuit of FIG. 5 and of a circuit of FIG. 6, obtained by simulation.
Figure 9:
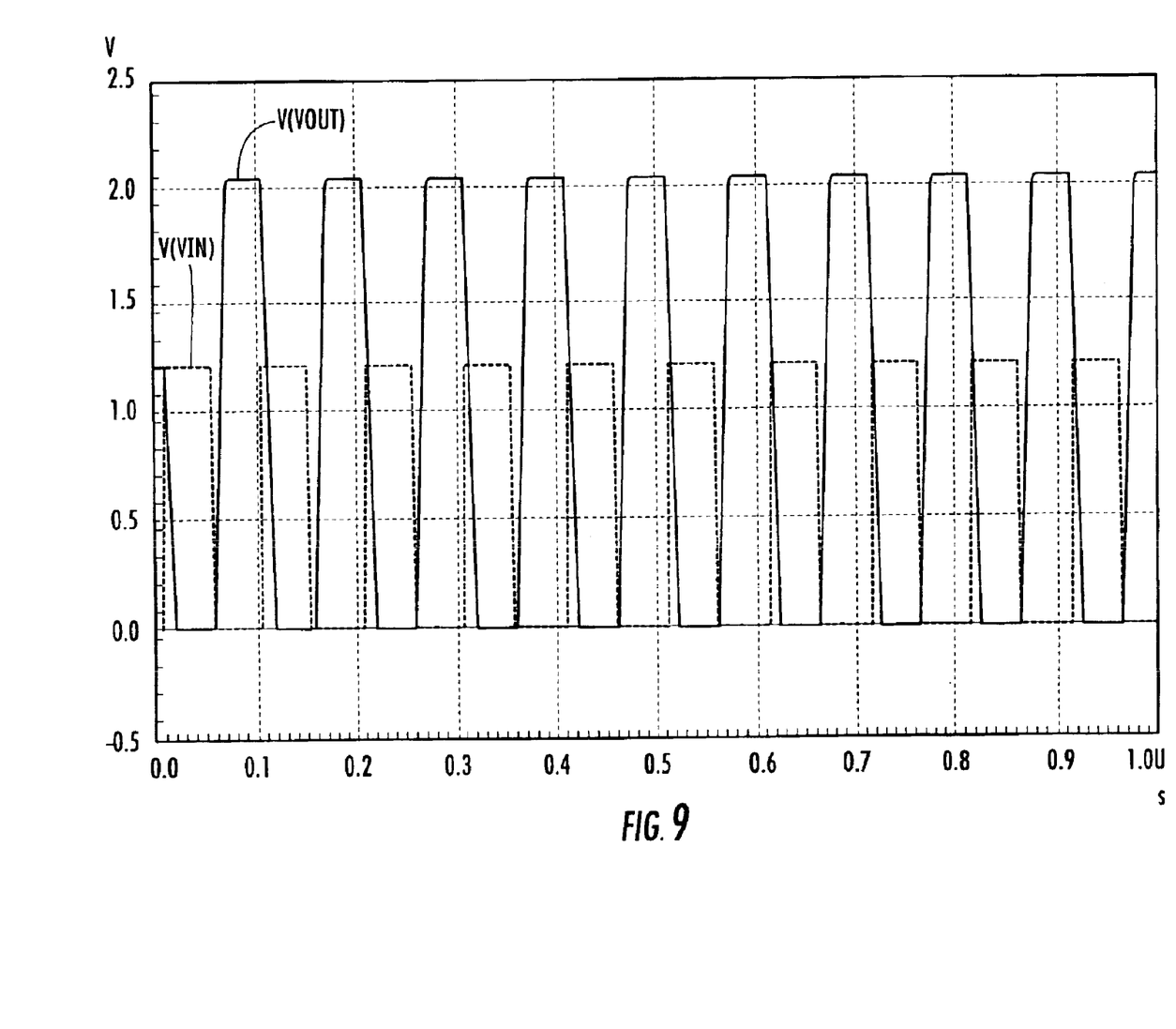
Figure 10:
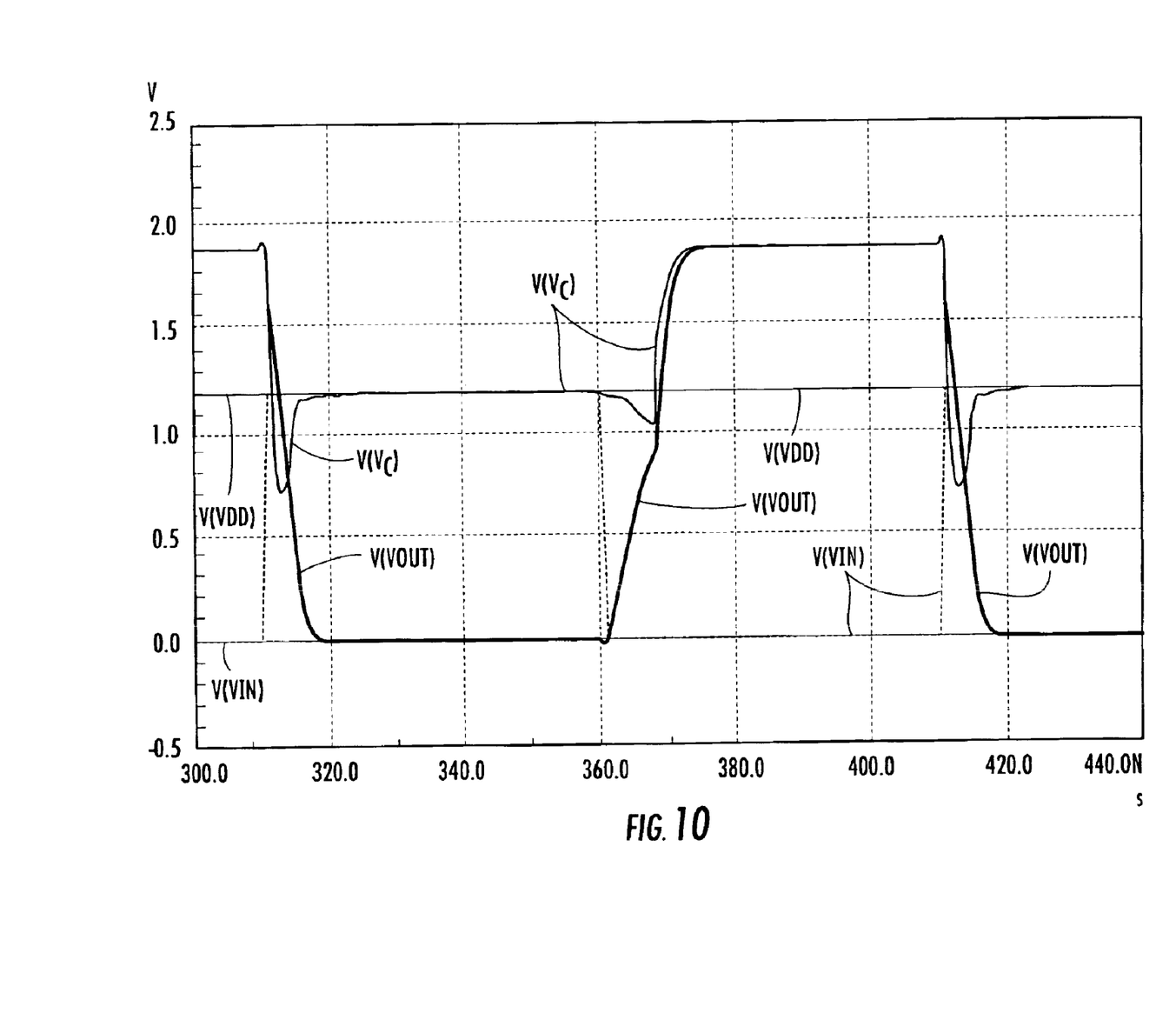
FIGS. 10 and 11 are enlarged views of the waveforms of FIGS. 8 and 9.
Figure 11:
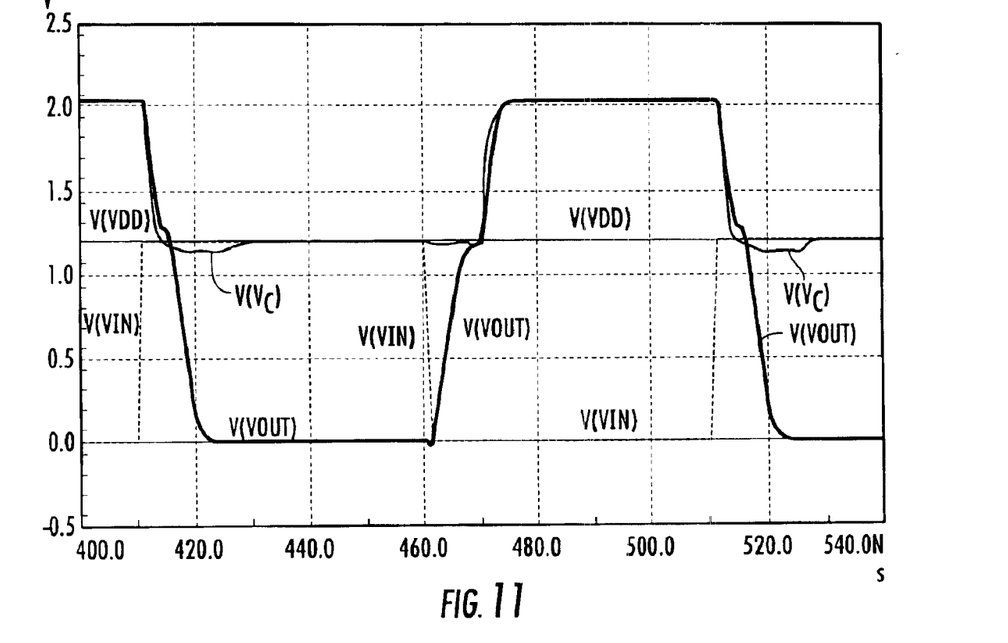

FIGS. 8 and 9 compare the waveforms, obtained by simulation, of the input voltage $V_{IN}$ and of the output voltage $V_{OUT}$ for the basic circuit of FIG. 5 and for the alternative circuit of FIG. 6. FIGS. 10 and 11 are enlarged waveforms of FIGS. 8 and 9 and show also the supply voltage $V_{dd}$ and the voltage $V_C$ on the first capacitor C. A comparative analysis has been carried out by simulation on a known charge pump voltage booster and on the charge pump voltage booster of this invention, realized according to the two alternative embodiments depicted in FIGS. 5 and 6, to highlight quantitatively the relative advantages.

Figure 12:
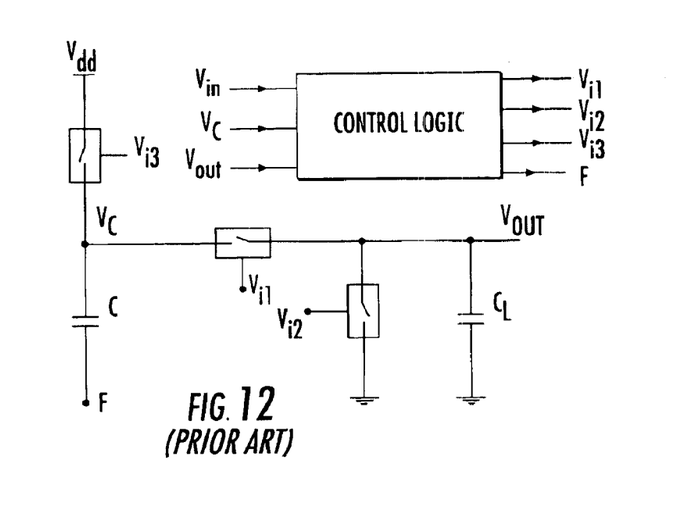
FIG. 12 is a basic diagram of a voltage booster to which the analysis refers.

The functional block diagram of a conventional voltage booster to which the simulations are referred is depicted in FIG. 12. A supply voltage $V_{dd}$=1.2V and a load (output) capacitance $C_L$=3 pF have been assumed for the simulations.

Figure 13:
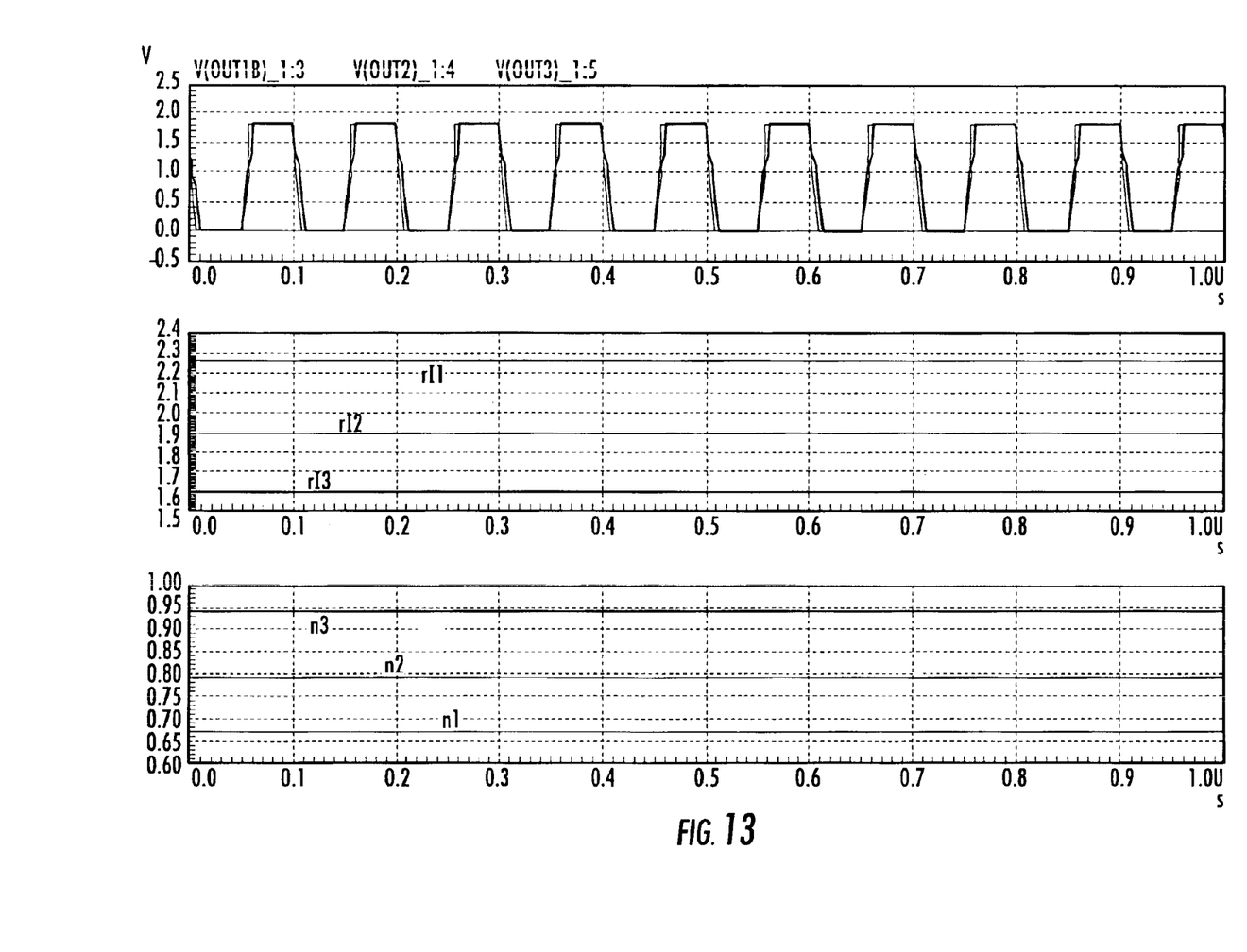
FIGS. 13 and 14 are waveforms of the input signal and of the output signal for a conventional circuit and for the circuits of FIG. 5 and of FIG. 6.
Figure 14:
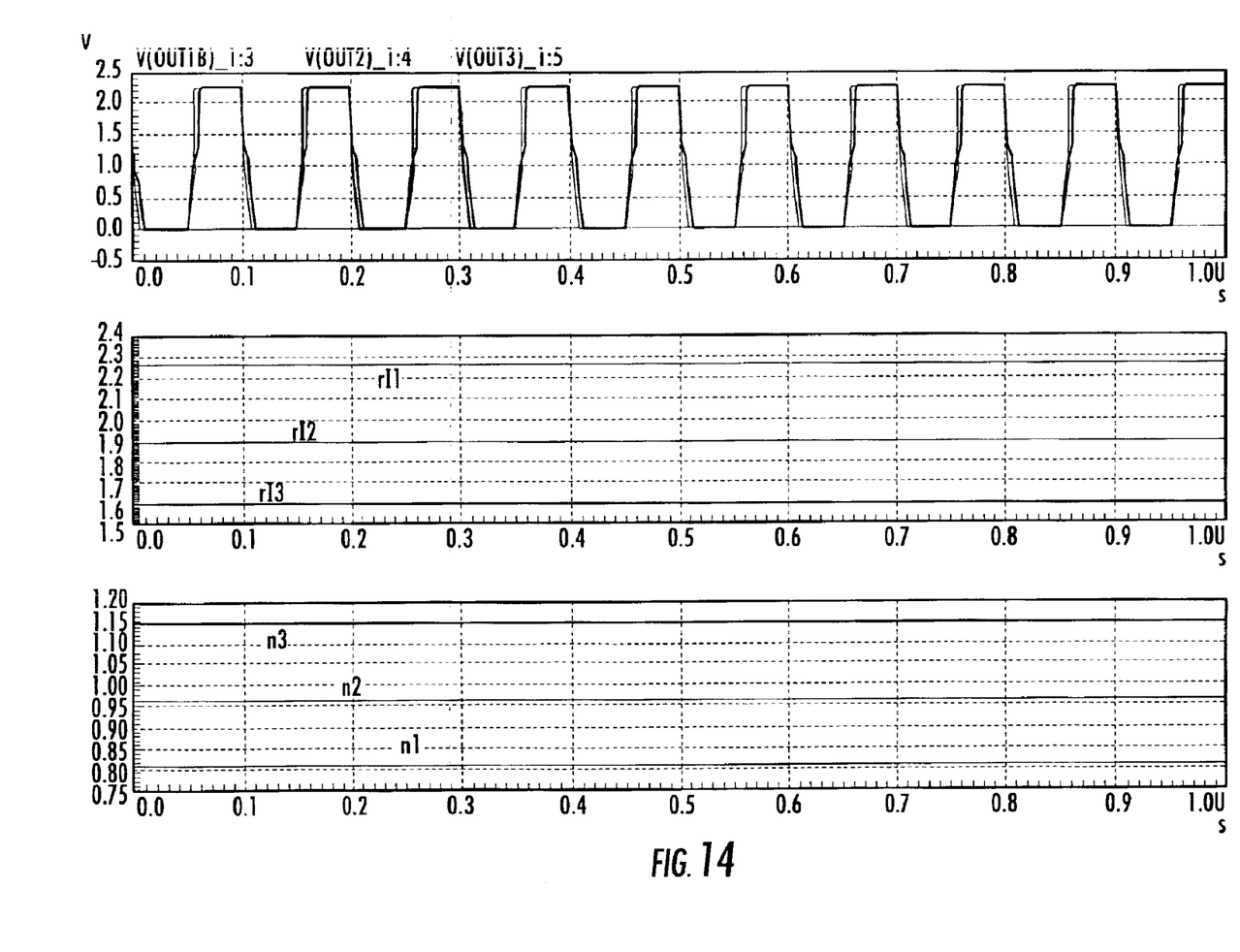

FIGS. 13 and 14 show (for $V_{OUT}$=1.8V and 2.2V, respectively) the output voltages, $V_{out}$, for the circuit of the prior art and for the two alternative circuits of the invention of FIGS. 5 and 6, the current ratios $$rI = \frac{I_{Vdd}}{I_{out}}$$

and the yield $$n = \frac{P_{out}}{P_{in}} = \frac{V_{out} \cdot I_{out}}{V_{dd} \cdot I_{Vdd}} = \frac{V_{out}}{V_{dd}} \cdot rI^{-1}.$$

Figure 15:
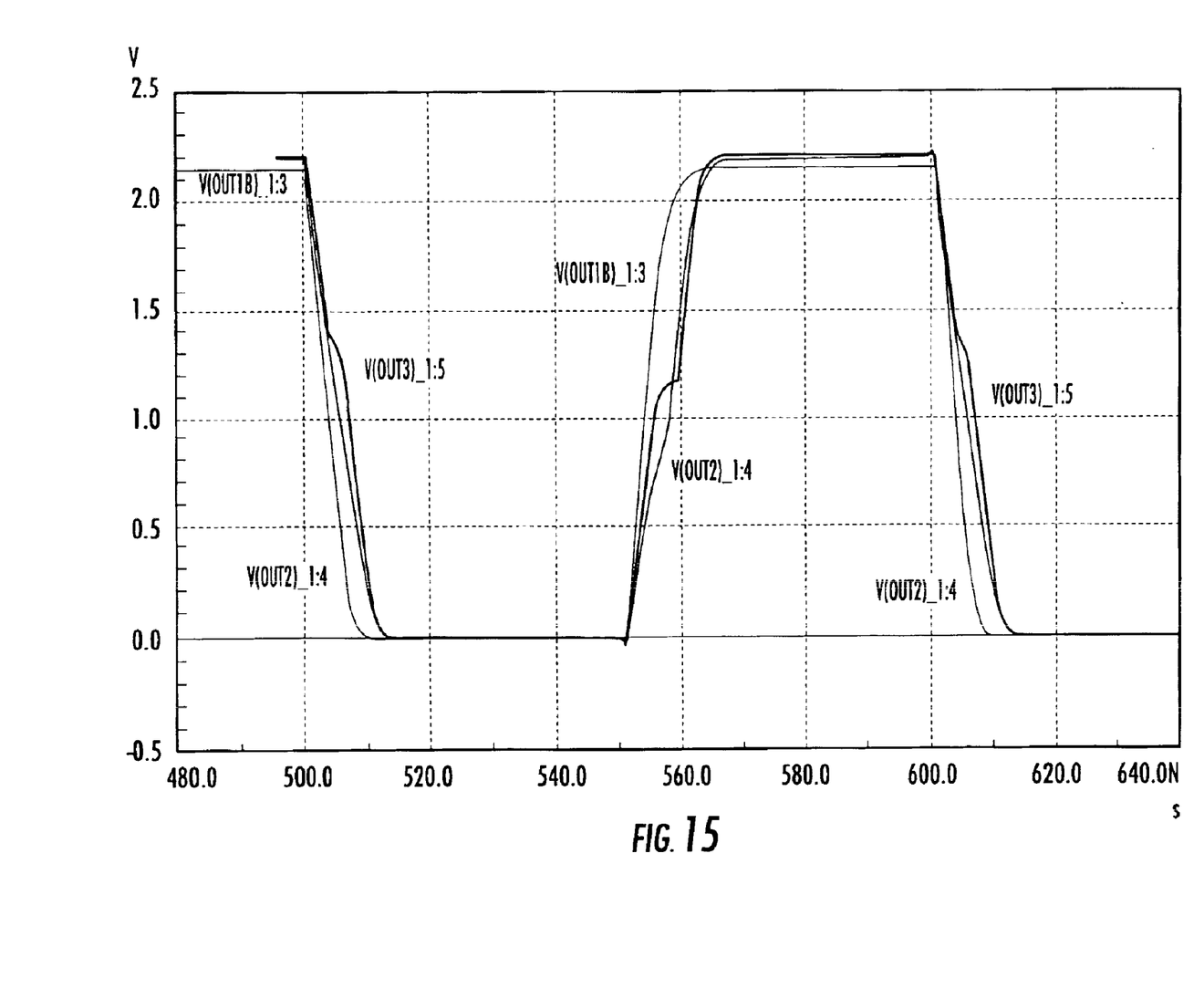
FIG. 15 shows a comparison of the output voltages of the three simulated circuits.

FIG. 15 depicts an enlarged view of the output voltage for the three circuits compared. The results of the simulations are resumed in the following tables and an estimation of the area requirements of the three circuits, for two different values of output voltage $V_{out}$.

TABLE 1

Results of the simulations for $V_{out}$ = 1.8 V

| Topology | $V_{dd}$ | $V_{out}$ | C | $C_{out}$ | rI | n | Area |
|---|---|---|---|---|---|---|---|
| Prior art | 1.2 V | 1.8 V | 10 pF | 3 pF | 2.25 | 0.67 | 5500 um² |
| FIG. 5 | 1.2 V | 1.8 V | 7 pF | 3 pF | 1.9 | 0.79 | 3800 um² |
| FIG. 6 | 1.2 V | 1.8 V | 4 pF | 3 pF | 1.6 | 0.94 | 2200 um² |

TABLE 2

Results of the simulations for $V_{out}$ = 2.2 V

| Topology | $V_{dd}$ | $V_{out}$ | C | $C_{out}$ | rI | n | Area |
|---|---|---|---|---|---|---|---|
| Prior art | 1.2 V | 2.2 V | 36 pF | 3 pF | 2.25 | 0.81 | 20000 um² |
| FIG. 5 | 1.2 V | 2.2 V | 28 pF | 3 pF | 1.9 | 0.96 | 15000 um² |
| FIG. 6 | 1.2 V | 2.2 V | 22 pF | 3 pF | 1.6 | 1.15 | 12000 um² |

Finally, the respective advantages and drawbacks of the two alternative embodiments of the circuit of this invention, as compared to the prior art circuit, are summarized in the following table 3.

TABLE 3

Comparison between the two alternative embodiments

| Topology | rI | n | Area |
|---|---|---|---|
| FIG. 5 | −16% | +18% | −(25 ± 30) % |
| FIG. 6 | −30% | +40% | −(40 ± 60) % |

As can be seen, both embodiments of the circuit of this invention are more advantageous than the circuit of the prior art, both in terms of yield as well as of area requirement. In particular, the first embodiment of FIG. 5 (that implements a pre-charging of the output capacitance, toward the supply voltage) has a simpler structure than the second embodiment of FIG. 6 (that implements both a pre-charging toward $V_{dd}$ and a recovery of the electric charge from the load capacitance) but gives less advantages in terms of yield and area requirement.

That which is claimed is:

1. An integrated charge pump voltage booster for boosting the voltage of a digital input signal, comprising:
    an input node for receiving the digital input signal;
    a supply node;
    a first switch connected to the supply node;
    a first capacitor having a first terminal coupled to the supply node via a first switch, and having a second terminal:
    a second switch;
    an output node connected to the first terminal through the second switch;
    a third switch connected to a reference potential;
    a capacitive load connected to the output node and to the third switch;
    control means for closing said first and third switches, for opening said second switch and for grounding the second terminal of said first capacitor at the end of a second phase of the digital input signal and for opening said third switch and closing said second switch at the end of a first phase of the digital input signal, so that when a voltage on the output node increases enough to open said first switch, said second terminal of the first capacitor is coupled to the supply node
    the first and second switches comprising PMOS transistors each having biasing means for biasing their respective body regions at a voltage not lower than their respective source and drain voltages;
    said third switch comprising an NMOS transistor;
    said control means comprising a logic NOR gate having
        a first input driven together with a common control node of said second switch and of said third switch by the digital input signal received on the input node,
        a second inverting input coupled in common with the gate of said first switch and said output node, and
        an output connected to said second terminal of the first capacitor.

2. The integrated charge pump voltage booster of claim 1, wherein the biasing means of said first switch comprises a biasing circuit connected between the supply node and said second terminal of the first capacitor, the biasing circuit including a biasing PMOS transistor and second capacitor, the gate of said biasing PMOS transistor being connected to the gate of said first switch.

3. The integrated charge pump voltage booster of claim 1, wherein said biasing means of the second switch comprises an electrical connection of the body region to the source region.

4. The integrated charge pump voltage booster of claim 1, wherein said control means further comprise:
    a fourth switch comprising a PMOS transistor connected between said first terminal of the first capacitor, the gate of said first switch and said inverting input of said logic NOR gate;
    a fifth switch comprising an NMOS transistor for grounding said common control node; and
    an inverter for driving the gates of said fourth and said fifth switch, and having an input coupled to said output node;

said second switch and said third switch being driven by the digital input signal, delayed by a time sufficient to recover a charge from said capacitive load through said second switch back to said first capacitor.

5. The integrated charge pump voltage booster of claim 4, wherein the biasing means of each of the first and second switches comprises an electrical connection of the body region to the respective source region.

6. The integrated charge pump voltage booster of claim 4, further comprising a unit gain buffer stage between the input node and the common control node of said second switch and of said third switch for introducing the delay sufficient to recover electric charge.

7. An integrated charge pump voltage booster comprising:
a first switch receiving a supply voltage;
a first capacitor connected to the first switch;
a second switch;
an output connected to the first capacitor through the second switch;
a third switch comprising an NMOS transistor and connected to a reference potential;
a capacitive load connected to the output and to the third switch;
a control circuit for closing said first and third switches, for opening said second switch and for grounding said first capacitor at the end of a second phase of a digital input signal, and for opening said third switch and closing said second switch at the end of a first phase of the digital input signal to couple said first capacitor to the supply node;
the first and second switches comprising PMOS transistors each having biasing circuit for biasing their respective body regions at a voltage not lower than their respective source and drain voltages;
said control circuit comprising a logic gate having
a first input connected to a common control node of said second switch and of said third switch and receiving the digital input signal,
a second inverting input coupled in common with the gate of said first switch and said output, and
a logic gate output connected to said capacitor.

8. The integrated charge pump voltage booster of claim 7, wherein said biasing circuit of said first switch is connected between said first capacitor and the supply voltage, the biasing circuit including a biasing PMOS transistor and a second capacitor, the gate of said biasing PMOS transistor being connected to the gate of said first switch.

9. The integrated charge pump voltage booster of claim 7, wherein said biasing circuit of said second switch comprises an electrical connection of the body region to the source region.

10. The integrated charge pump voltage booster of claim 7, wherein said control circuit further comprises:
a fourth switch comprising a PMOS transistor connected between the first capacitor, the gate of said first switch and said inverting input of said logic NOR gate;
a fifth switch comprising an NMOS transistor grounding said common control node; and
an inverter for driving the gates of said fourth and said fifth switches, and having an input coupled to said output;
said second switch and said third switch being driven by the input signal, delayed by a time sufficient to recover a charge from said capacitive load through said second switch back to said first capacitor.

11. The integrated charge pump voltage booster of claim 10, wherein the biasing circuit of each of the first and second switches comprises an electrical connection of the body region to the respective source region.

12. The integrated charge pump voltage booster of claim 10, further comprising a unit gain buffer stage receiving the input signal and connected to the common control node of said second switch and of said third switch for introducing the delay sufficient to recover electric charge.

13. A method for boosting the voltage of a digital input signal comprising:
supplying voltage to a first switch;
connecting the first switch to a first capacitor;
connecting the first capacitor to an output through a second switch;
connecting third switch comprising an NMOS transistor to a reference potential;
connecting capacitive load to the output and to the third switch;
closing the first and third switches, opening the second switch and grounding the first capacitor at the end of a second phase of the digit input signal;
closing the second switch and coupling the first capacitor to the supply voltage during a first phase of the input signal; and
providing a control circuit comprising a logic gate having a first input connected to a common control node of the second switch and of the third switch and receiving the digital input signal, a second inverting input coupled in common with the gate of the first switch and the output, and a logic gate output connected to the first capacitor;
the first and second switches comprising PMOS transistors each having a biasing circuit for biasing their respective body regions.

14. The method of claim 13, wherein said biasing circuit of said first switch is connected between said first capacitor and the supply voltage, the biasing circuit including a biasing PMOS transistor and a second capacitor, the gate of said biasing PMOS transistor being connected to the gate of said first switch.

15. The method of claim 13, wherein said biasing circuit of said second switch comprises an electrical connection of the body region to the source region.

16. The method of claim 13, wherein said control circuit further comprises:
a fourth switch comprising a PMOS transistor connected between the first capacitor, the gate of said first switch and said inverting input of said logic gate;
a fifth switch comprising an NMOS transistor for grounding said common control node; and
an inverter for driving the gates of said fourth and said fifth switches, and having an input coupled to said output;
said second switch and said third switch being driven by the input signal, delayed by a time sufficient to recover a charge from said capacitive load through said second switch back to said first capacitor.

17. The method of claim 16, wherein the biasing circuit of each of the first and second switches comprises an electrical connection of the body region to the respective source region.

18. The method of claim 16, further comprising connecting a unit gain buffer stage, to receive the input signal, to the common control node of said second switch and of said third switch for introducing the delay sufficient to recover the charge.

* * * * *

UNITED STATES PATENT AND TRADEMARK OFFICE
CERTIFICATE OF CORRECTION

PATENT NO. : 6,943,615 B2
DATED : September 13, 2005
INVENTOR(S) : Pappalardo et al.

It is certified that error appears in the above-identified patent and that said Letters Patent is hereby corrected as shown below:

Column 4,
Line 17, delete "inverter 1" insert -- inverter I --.

Column 5,
Line 62, delete "25 ± 30" insert -- 25 ÷ 30 --.
Line 63, delete "40 ± 60" insert -- 40 ÷ 60 --.

Column 6,
Line 15, delete "via a first" insert -- via the first --.
Line 26, delete "signal and" insert -- signal, and --.
Line 50, delete "and second" insert -- and a second --.

Column 7,
Line 57, delete "transistor grounding" insert -- transistor for grounding --.

Column 8,
Line 10, delete "supplying voltage" insert -- supplying a voltage --.
Line 15, delete "connecting third" insert -- connecting a third --.
Line 17, delete "connecting capacitive" insert -- connecting a capacitive --.
Line 21, delete "digit" insert -- digital --.
Line 23, delete "the input" insert -- the digital input --.

Signed and Sealed this

Second Day of May, 2006

JON W. DUDAS
*Director of the United States Patent and Trademark Office*